US012592582B2

(12) United States Patent
Shields et al.

(10) Patent No.: US 12,592,582 B2
(45) Date of Patent: Mar. 31, 2026

(54) VOLTAGE REGULATOR CONTROL IN ELECTRIC POWER SYSTEMS WITH DISTRIBUTED GENERATION

(71) Applicant: Schweitzer Engineering Laboratories, Inc., Pullman, WA (US)

(72) Inventors: Shawn R. Shields, Portland, OR (US); Benjamin T. Rowland, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 191 days.

(21) Appl. No.: 18/732,426

(22) Filed: Jun. 3, 2024

(65) Prior Publication Data

US 2025/0373071 A1 Dec. 4, 2025

(51) Int. Cl.
| | |
|---|---|
| *H02J 13/00* | (2026.01) |
| *G05F 1/14* | (2006.01) |
| *H02H 7/26* | (2006.01) |
| *H02J 3/38* | (2026.01) |

(52) U.S. Cl.
CPC .......... *H02J 13/00002* (2020.01); *G05F 1/14* (2013.01); *H02H 7/26* (2013.01); *H02J 3/381* (2013.01)

(58) Field of Classification Search
CPC ....... H02J 13/00002; H02J 3/381; G05F 1/14; H02H 7/26
See application file for complete search history.

(56) References Cited

U.S. PATENT DOCUMENTS

| | | | | |
|---|---|---|---|---|
| 5,428,551 | A | * | 6/1995 | Trainor ..................... G05F 1/14 700/298 |
| 7,271,572 | B2 | | 9/2007 | Labuschagne |
| 7,504,806 | B2 | | 3/2009 | Labuschagne |
| 7,759,913 | B2 | | 7/2010 | Labuschagne |
| 8,476,874 | B2 | | 7/2013 | Labuschagne |
| 9,250,282 | B2 | | 2/2016 | Ukil et al. |
| 9,366,715 | B2 | | 6/2016 | Ukil et al. |

(Continued)

OTHER PUBLICATIONS

IntelliCap® 2000 Automatic Capacitor Control Instruction Sheet 1024-540, S&C Electric Company, Aug. 2019.

(Continued)

*Primary Examiner* — Jeffrey M Shin
(74) *Attorney, Agent, or Firm* — Jared L. Cherry

(57) ABSTRACT

The present disclosure relates to control of a voltage regulator in an electric power system. In one embodiment, a system to control a voltage regulator includes a communication interface configured to communicate with the voltage regulator. A power flow direction subsystem may determine a direction of a current flow in the electric power system. A tap change monitoring subsystem may monitor tap changes implemented by the voltage regulator to evaluate a voltage change resulting from each of the plurality of tap changes and determine a source stiffness value for a first source and a second source. A voltage regulator control subsystem is configured to determine a regulation direction based on the direction of current flow determined by the power flow direction subsystem and based on the source stiffness value for the first source and the second source, and communicate the regulation direction to the voltage regulator through the communication interface.

20 Claims, 10 Drawing Sheets

(56)  References Cited

U.S. PATENT DOCUMENTS

| | | | |
|---|---|---|---|
| 10,161,986 B2 | 12/2018 | Schweitzer | |
| 10,830,832 B2 | 11/2020 | Hao | |
| 11,320,845 B2 | 5/2022 | McFetridge | |
| 2003/0099070 A1 | 5/2003 | Macbeth | |
| 2007/0226602 A1 | 9/2007 | Kirmser | |
| 2013/0141827 A1 | 6/2013 | Ukil et al. | |
| 2013/0221977 A1 | 8/2013 | Ukil et al. | |
| 2014/0200843 A1 | 7/2014 | Shamir | |
| 2015/0185743 A1 | 7/2015 | McFetridge | |
| 2015/0293164 A1 | 10/2015 | Stephenson | |
| 2015/0309105 A1 | 10/2015 | Ostrovsky | |
| 2016/0187409 A1 | 6/2016 | Kolker | |
| 2016/0187410 A1 | 6/2016 | Kolker | |
| 2016/0202321 A1 | 7/2016 | Drame | |
| 2016/0245850 A1 | 8/2016 | Kasztenny | |
| 2018/0131188 A1* | 5/2018 | Metcalfe | H02J 3/1878 |
| 2018/0292447 A1 | 10/2018 | Piyasinghe | |
| 2019/0037515 A1 | 1/2019 | Shamir | |
| 2019/0123668 A1 | 4/2019 | Da Costa | |
| 2019/0331722 A1 | 10/2019 | Hao | |
| 2021/0111561 A1 | 4/2021 | Blair | |

OTHER PUBLICATIONS

Ukil, Abhisek, et al., "Current-Only Directional Overcurrent Relay". IEEE Sensors Journal, Nov. 22, 2010, vol. 11, Issue 6.

Ukil, Abhisek, et al., "Current-Only Directional Overcurrent Protection for Distribution Automation: Challenges and Solutions". IEEE Transactions on Smart Grid, Aug. 22, 2012, vol. 3, Issue 4.

Yalla, Dr. Murty V.V.S., "Design of a New Operating Mode for Voltage Regulator Contols in a Smart Distribution System". 2017 IEEE Rual Electric Power Conference.

* cited by examiner

VOLTAGE REGULATOR CONTROL IN ELECTRIC POWER SYSTEMS WITH DISTRIBUTED GENERATION

TECHNICAL FIELD

The present disclosure relates to systems and methods to control voltage regulators in electric power systems with distributed generation.

BRIEF DESCRIPTION OF THE DRAWINGS

Non-limiting and non-exhaustive embodiments of the disclosure are described, including various embodiments of the disclosure with reference to the figures, in which.

Figure 1:
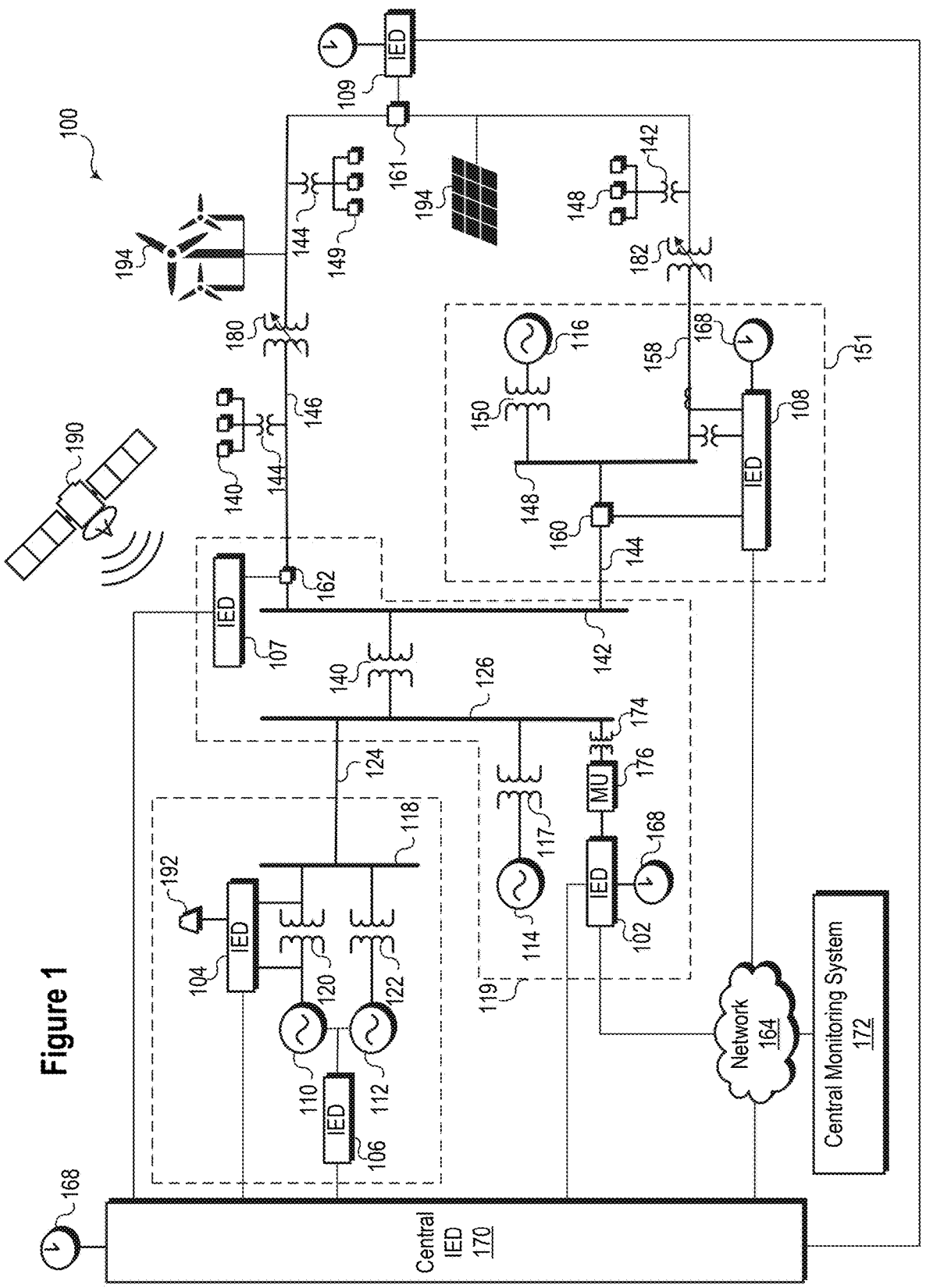
FIG. 1 illustrates a simplified one-line diagram of an electric power system consistent with embodiments of the present disclosure.

The following description provides numerous specific details for a thorough understanding of the various embodiments disclosed herein. However, those skilled in the art will recognize that the systems and methods disclosed herein can be practiced without one or more specific details, or with other methods, components, materials, etc. In addition, in some cases, well-known structures, materials, or operations may not be shown or described in detail to avoid obscuring aspects of the disclosure. Furthermore, the described features, structures, or characteristics may be combined in any suitable manner in one or more alternative embodiments.

DETAILED DESCRIPTION

Electric power systems generate, transmit, and distribute electric power to loads and serve as an important part of critical infrastructure. Various types of equipment may monitor and protect electric power systems and equipment. Protection relays may analyze the parameters of an electric power system to implement protective functions. The primary protective relays may communicate with various other supervisory devices, such as automation systems, monitoring systems, supervisory (SCADA) systems, and other intelligent electronic devices (IEDs). IEDs may collect data from various devices within an electric power system and monitor, control, automate, and/or protect such devices.

As used herein, an IED may refer to any microprocessor-based device that monitors, controls, automates, and/or protects monitored equipment within a system. Such devices may include, for example, differential relays, distance relays, directional relays, feeder relays, overcurrent relays, voltage regulator controls, voltage relays, breaker failure relays, generator relays, motor relays, remote terminal units, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. Further, IEDs may include sensors (e.g., voltage transformers, current transformers, contact sensors, status sensors, light sensors, tension sensors, etc.) that provide information about the electric power system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order or even sequentially, nor do the steps need to be executed only once unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. The quoted phrases, or variations thereof, as recited throughout this specification do not necessarily all refer to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. For instance, a software module or component may comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. A module or component may comprise a single instruction or many instructions and may be distributed over several different code segments, among different programs, and across several memory devices. Some embodiments may be practiced in a distributed computing environment where tasks are performed by a remote processing device linked through a communications network. Software modules or components may be located in local and/or remote memory storage devices in a distributed computing environment. In addition, data being tied or rendered together in a database record may be resident in the same memory device or across several memory devices and may be linked together in fields of a record in a database across a network.

Embodiments may be provided as computer program products, including a non-transitory machine-readable medium to store instructions that may be used to program a computer or other electronic device to perform the processes described herein. The non-transitory machine-readable medium may include but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/ machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific interface circuit (ASIC), PAL, PLA, PLD, field-programmable gate array (FPGA), or any other customizable or programmable device.

FIG. 1 illustrates a simplified one-line diagram of an electric power system 100 consistent with embodiments of the present disclosure. Electric power system 100 may be configured to generate, transmit, and distribute electric energy to loads. The present disclosure may be utilized in alternating current electric power systems. Electric power systems may include equipment such as electrical generators (e.g., generators 110, 112, 114, and 116), transformers (e.g., voltage transformers 117, 120, 122, 130, 142, 143, 144, 150, and 174), distribution lines (e.g., lines 124, 134, 136, and 158), circuit breakers (e.g., breakers 160, 161, 162), busses (e.g., busses 118, 126, 132, and 148), loads (e.g., loads 138, 139 and 140) and the like. Various other types of equipment may also be included in electric power system 100.

Substation 119 may include a generator 114, which may be a distributed generator, and which may be connected to bus 126 through voltage transformer 117. Bus 126 may be connected to a distribution bus 132 via a step-down transformer 130. Distribution lines 136 and 134 may be connected to distribution bus 132. The electrical connection between bus 126 and distribution line 136 may be selectively interrupted by using breaker 162, which is controlled by IED 107. Load 140 may be fed from distribution line 136. Further, step-down transformers 143 and 144 are in electrical communication with distribution bus 132 via distribution line 136 and may be used to step down a voltage for consumption by loads 139 and 140, respectively.

A voltage regulator 180 may regulate the voltage on distribution line 136. Voltage regulator 180 may be operated and controlled using the systems and methods disclosed herein.

Distribution line 134 may lead to substation 151 and deliver electric power to bus 148. Bus 148 may also receive electric power from distributed generator 116 via transformer 150. Distribution line 158 may deliver electric power from bus 148 to load 138 and may include further step-down transformer 142. Breaker 160 may be used to selectively connect bus 148 to distribution line 134. IED 108 may be used to monitor and/or control breaker 160 and distribution line 158.

A voltage regulator 182 may regulate the voltage on distribution line 158. Voltage regulator 182 may be operated and controlled using the systems and methods disclosed herein.

Electric power system 100 may be monitored, controlled, automated, and/or protected using IEDs, such as IEDs 102, 104, 106, 107, 108, 109, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

Central monitoring system 172 may comprise one or more of a variety of systems. For example, central monitoring system 172 may include a supervisory control and data acquisition (SCADA) system and/or a wide area control and situational awareness (WACSA) system. A central IED 170 may be in communication with IEDs 102, 104, 106, and 108. IEDs 102, 104, 106, and 108 may be remote from the central IED 170 and may communicate over various media, such as direct communication from IED 106 or over a wide-area communications network 163. According to various embodiments, certain IEDs may be in direct communication with other IEDs (e.g., IED 104 is in direct communication with central IED 170) or may be in communication via a communication network 163 (e.g., IED 108 is in communication with central IED 170 via communication network 163).

A common time signal 168 may be used to time-align measurements for comparison and/or synchronize action across electric power system 100. Utilizing a common or universal time source may allow for the generation of time-synchronized data, such as synchrophasors. In various embodiments, the common time source may comprise a time signal 168 from a GNSS system 190. IED 104 may include a receiver 192 configured to receive the time signal 168 from the GNSS system 190. In various embodiments, IED 106 may be configured to distribute the time signal 168 to other components in electric power system 100, such as IEDs 102, 104, 108, and 170.

A voltage transformer 174 may communicate with a merging unit (MU) 176. MU 176 may provide information from voltage transformer 174 to IED 102 in a format usable by IED 102. MU 176 may be placed near voltage transformer 174 and digitize discrete input/output (I/O) signals and analog data, such as voltage measurements. These data may then be streamed to IED 102. In various embodiments, MU 176 may be located outside a substation enclosure or control house, thus increasing safety by removing high-energy cables from areas where personnel typically work. In various embodiments, MU 176 may be embodied as an SEL-2240 available from Schweitzer Engineering Laboratories of Pullman, Washington.

Components with system 100 may operate to maintain voltages within fixed ranges. One or more voltage regulators may operate in system 100 to maintain voltages within the fixed ranges. Traditional voltage regulator controls have an unregulated voltage side (typically the side connected to source busses, such as busses 132 and 148) and a regulated voltage side (typically the load, such as loads 138, 139, and 140). In a traditional power system with centralized generation (e.g., generators 110 and 112), power flows from the bulk power system through the regulator and to the load. In this arrangement, power direction is used to determine which side of the regulator is the regulated voltage.

System 100 may further include distributed energy resources ("DERs"). DERs may include various types of generation, including intermittent sources like a photovoltaic array 193 and a wind farm 194. During periods of operation, photovoltaic array 193 and wind farm 194 may cause a change in the direction of regulation of voltage regulator 180 and voltage regulator 182. For example, current may typically flow from left to right through voltage regulator 182; however, when photovoltaic array 193 generates significant power, the direction of the current may reverse and flow from right to left through voltage regulator 182. Similarly, a high output from wind farm 194 may reverse the typical direction current.

In the illustrated embodiment, distribution line 136 and distribution line 158 may be selectively connected using breaker 161, which is controlled by IED 109. Breaker 161 may be normally open; however, IED 109 may close breaker 161 based on conditions in electric power system 100.

Distributed generation complicates voltage regulation because the direction of power flow may change when DERs provide power to a bulk power system (e.g., a larger electrical system). A common approach to this issue requires an operator to select either a "tap delta voltage" mode or "power quadrant" based operating mode for regulation. In the "tap delta voltage" mode, a voltage regulator may make one or more adjustments and determine the impact of the adjustment(s) on the voltage to gauge the stiffness of a source. In some embodiments, the stiffness may be gauged by monitoring a voltage measurement following a tap change. If a tap change is applied to a weak source, the voltage will change as expected; however, if a tap change is applied to a stiff source, the voltage changes little, if at all. Following the detection of a certain number of tap changes (e.g., two, three, etc.) that result in a voltage change, or little if any voltage change, as the case may be, various embodiments may change the regulation direction.

The power flow direction may be set such that power flows out from the stiffer source. In the "power quadrant" based operating mode, the voltage regulator may attempt to determine the power flow based on the active power and reactive power. In quadrants 1 and 4, the active power is positive, while in quadrants 2 and 3, the active power is negative. Operation in quadrants 1 and 4 may be described as "forward" or "import," while operation in quadrants 2 and 3 may be described as "reverse" or "export." The direction of the power flow may be based on the quadrant in which the system is operating at a given time.

Systems operating in either a "tap delta voltage" or a "power quadrant" mode may fail to realize the benefits of utilizing elements of both modes. For example, if a regulator is installed near a normally open tie point, it is traditionally configured in the 'power quadrant' mode. However, if the regulator is installed near a DER, there is a potential that if a power flow reversal occurs, it may result from a DER. If the "power quadrant" mode is implemented, the voltage regulator could be exposed to a runaway condition where the regulator would tap to min or max in a failed attempt to regulate a stiff voltage source (tap out), and voltage levels are left unprotected from mischaracterizing a current reversal as from a line switching event. Alternatively, if the "tap delta voltage" mode is selected, the regulator is required to tap at least two times (test tap) to determine if a line switching event occurs, which results in unnecessary voltage regulator operations and slower voltage correction. Similarly, if a midline regulator operates in a feeder with DER only on the normal load side and the traditional "power quadrant" mode is chosen, then when operating in reverse regulation, if a sudden current reversal from reverse to forward occurs, then despite the fact that forward power can only be the result of a stiff source (there is no DER on the normal source side), it is still required to 'test tap' to qualify a line switching event before switching to regulating the normal load side (forward).

In various embodiments consistent with the present disclosure, a voltage regulator may analyze both the power quadrant in which a system is operating as well as the stiffness of the source to determine the power flow direction. Such a system may be configured to quickly transition to forward regulation without having to 'test tap' and then tap twice in the other direction following an ineffective tap since it considers the power quadrant in addition to tap delta voltage. As a result, systems consistent with the present disclosure may respond more quickly to changes in conditions. The quicker response is attributable to multiple factors in different embodiments. Some embodiments may evaluate circuit topology, reducing the likelihood of tapping in the wrong direction. Further, utilizing both tap delta voltage and power quadrant analysis in a single mode improves operational efficiency.

Embodiments consistent with the present disclosure may utilize multiple techniques to improve voltage regulation. Under appropriate circumstances, systems consistent with the present disclosure may transition between voltage regulation modes based on voltage changes resulting from tap changes implemented by the voltage regulator. The tap changes may allow a system to determine a source stiffness value for multiple sources (e.g., a bulk power system and a DER). A regulation direction may be based on the direction of current flow determined by the power flow direction subsystem and based on the stiffness values of sources. In certain circumstances, more rapid transition transitions may be enabled based on system topology; however, such rapid transitions may be verified by ongoing evaluations of current flow and source stiffness.

Figure 2A:
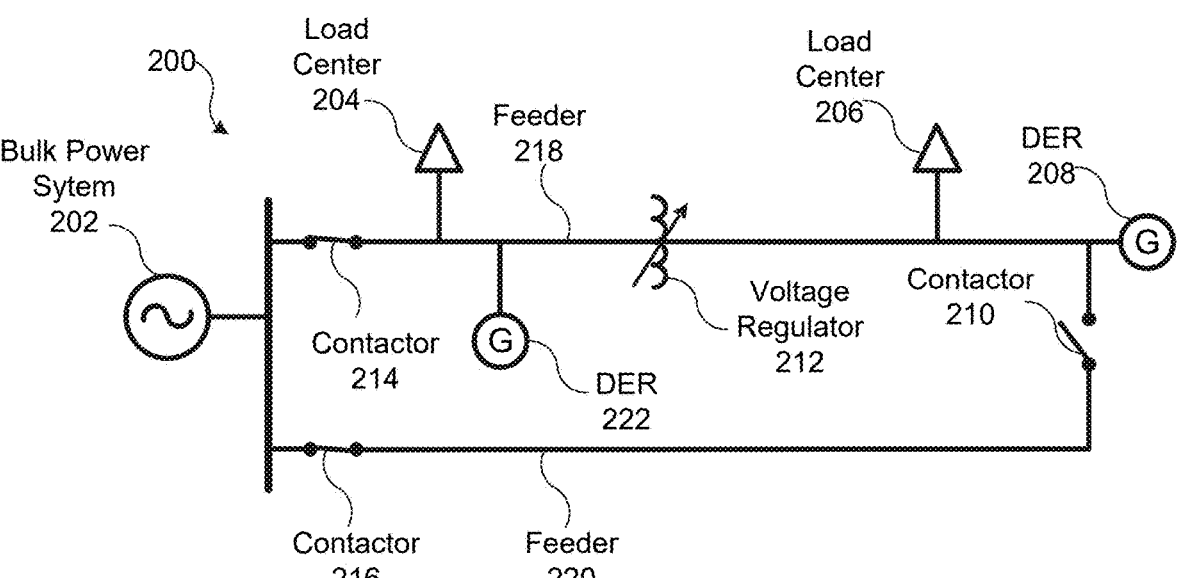
FIG. 2A illustrates a single-line diagram of a portion of an electric power system, including feeders that may be configured in a loop scheme and multiple distributed energy resources ("DERs") consistent with embodiments of the present disclosure.

FIG. 2A illustrates a single-line diagram of a portion of an electric power system 200, including feeders 218 and 220 that may be configured in a loop scheme, and multiple DERs 208 and 216 consistent with embodiments of the present disclosure. A default configuration is shown in FIG. 2A, in which contactors 214 and 216 are closed and contactor 210 is open. In this configuration, load centers 204 and 206 are supplied by feeder 218, and no current flows through contactor 210.

In various embodiments, the state of the contactors may not be available for use in connection with voltage regulation. Voltage regulator 212 regulates power provided by bulk power system 202 to load center 206. In typical operation, the direction of the power flow (i.e., left to right) is the same as the regulation direction of voltage regulator 212, and voltage regulator 212 may operate in a forward operation mode.

In the illustrated configuration, two conditions may result in a reverse power condition (i.e., power flowing from right to left). First, the output of DERs 208 and 222 may vary over time. An increase in the output of DER 208 may result in a reversal (i.e., right to left) of the typical direction of current flow. Second, contactor 210 may be closed and contactor 214 may be opened, which may be referred to as a switching event. When contactor 210 is closed and contactor 214 is open, power from bulk power system 202 flows through feeder 220 and flows from the right to the left through voltage regulator 212.

A system controlling voltage regulator 212 may lack sufficient information to determine whether a change in current direction is due to a switching event (i.e., contactor 214 opening and 210 closing) or from a change in output of DERs 208 and 222. In a scenario with no additional information, it would be appropriate to operate based only on the evaluation of the voltage change following a tap and without considering the power flow direction.

Figure 2B:
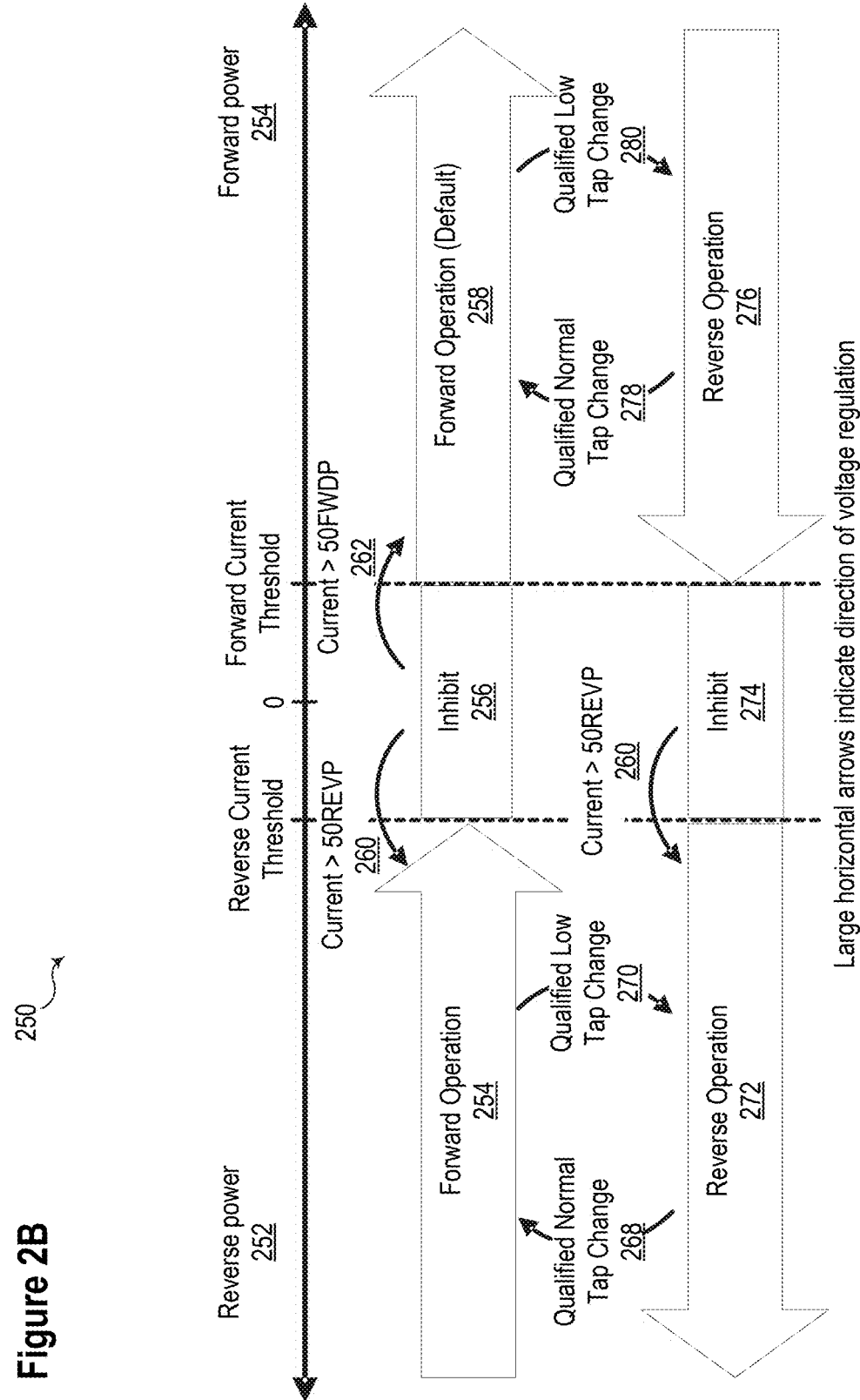
FIG. 2B illustrates a conceptual diagram showing a voltage regulation scheme that may be used in connection with the system illustrated in FIG. 2A and consistent with embodiments of the present disclosure.

FIG. 2B illustrates a conceptual diagram 250 showing a voltage regulation scheme that may be used in connection with system 200, illustrated in FIG. 2A, and consistent with embodiments of the present disclosure. The large horizontal arrows show the direction of voltage regulation. A forward operation 258 mode may be the default mode of operation, and the system may initialize in that mode. The forward operation 258 mode may continue until a threshold number of qualified low tap change events 230 are detected, while a measured current remains above a forward current 262 threshold.

Once the threshold number of qualified low tap change events 280 are detected, the operating mode changes to reverse operation 226. Regulation may remain in reverse operation 276 while the measured current remains above the forward current 262 threshold. Regulation may remain in reverse operation 276 mode until a threshold number of qualified normal tap change events 278 occur.

Inhibit modes 256 and 274 may be active when the measured current is between a reverse current 260 threshold and the forward current threshold 262. The reverse current threshold 260 and the forward current threshold 262 may be selected such that the power flow is near zero. In inhibit modes 256 and 274, voltage regulation may be suspended. From inhibit mode 256, a transition to forward operation 258 mode may occur if the measured current exceeds the forward current threshold 262, and a transition to forward operation 254 mode may occur if the measured current exceeds the reverse current 260 threshold.

In a reverse power condition 252, the measured current is greater than a reverse current threshold 260. A forward operation mode 254 may be active until a threshold number of qualified low tap change events 270 are detected and while the current remains above the forward current threshold 262. Detection of the threshold number of qualified low tap change events 270 may result in a transition to reverse operation mode 272. Reverse operation mode 272 may remain active until a threshold number of qualified normal tap change events 268 are detected and while the current remains above a reverse power threshold. After satisfying the number of qualified normal tap change events 268, a forward operation 254 mode may be activated. Changes to various conditions may result in a transition to the operating mode identified in FIG. 2A, as discussed in greater detail below.

Figure 3A:
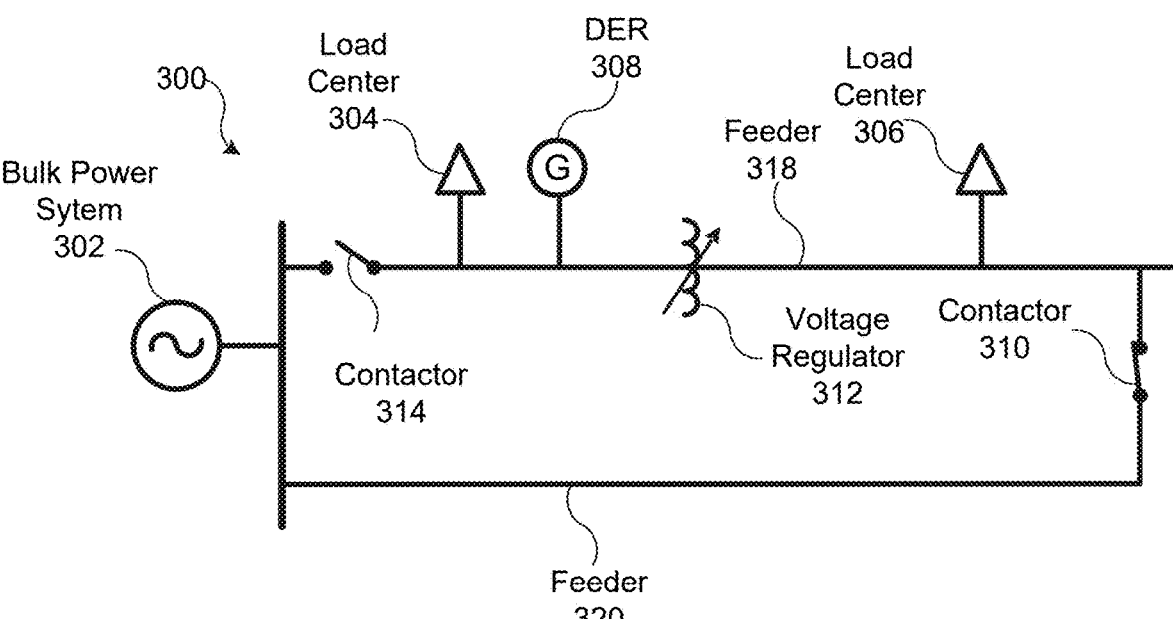
FIG. 3A illustrates a single-line diagram of a portion of an electric power system, including feeders that may be configured in a loop scheme and a single DER connected between two load centers and consistent with embodiments of the present disclosure.

FIG. 3A illustrates a single-line diagram of a portion of an electric power system 300, including feeders 318 and 320 that may be configured in a loop scheme, and a single DER 308 connected between load centers 304 and 306 and consistent with embodiments of the present disclosure. If electrical current was originally flowing from left to right through voltage regulator 312 and the current switches and flows from right to left, the cause of the reversal is a switching event (i.e., contactor 310 closing and contactor 314 opening). The cause of the reversal is unambiguous because bulk power system 302 and DER 308 are on the same side of voltage regulator 312 when contactor 314 is closed and contactor 310 is open. The topology of system 300 may be used to enable faster transitions of voltage regulator 312 between a forward operation mode and a reverse operation mode, as discussed in greater detail in FIG. 3B.

Figure 3B:
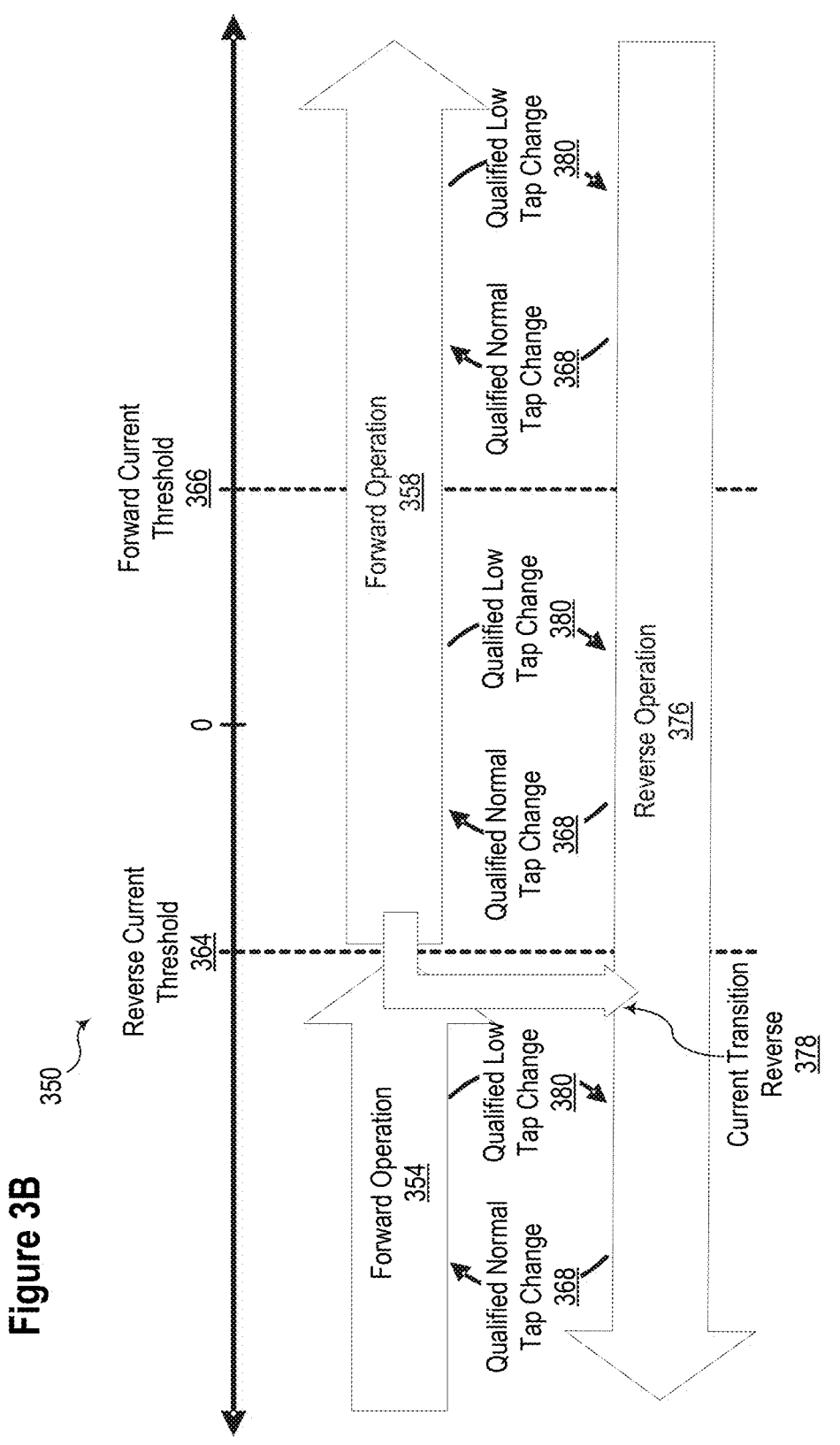
FIG. 3B illustrates a conceptual diagram showing a voltage regulation scheme that may be used in connection with the system illustrated in FIG. 3A and consistent with embodiments of the present disclosure.

FIG. 3B illustrates a conceptual diagram 350 showing a voltage regulation scheme that may be used in connection with system 300, illustrated in FIG. 3A, and consistent with embodiments of the present disclosure. In contrast to FIG. 2B, the scheme illustrated in FIG. 3B may not operate in inhibit operation modes (although systems implementing the scheme may be capable of such operation). In the embodiment illustrated in FIG. 3B, a user setting may determine behavior when current flow is between reverse current threshold 364 and forward current threshold 366. In the illustrated embodiment, the system may transition to the reverse operation 376 mode once the reverse current threshold 364 is crossed. In addition, the scheme illustrated in FIG. 3B may enable faster transitions between a forward operation mode 358 and a reverse operation mode 376, as shown by arrow 378. Once a reverse current threshold 364 is exceeded, some embodiments consistent with the present disclosure may immediately transition to the reverse operation mode 376, as shown by arrow 378. In other words, unlike the scheme illustrated in FIG. 2B, the scheme illustrated in FIG. 3B, may make the transition without waiting for a qualified number of tap changes.

Once the transition indicated by arrow 378 is complete, a system may continue to verify that the system is operating in the correct mode by evaluating the current flow and source stiffness. As such, even if the rapid transition was made in error, following a threshold number of qualified tap changes, the system may transition to forward operation mode 354.

A transition to the forward operation mode cannot be assumed to be the result of a switching event. For example, if a system is in the configuration shown in FIG. 3A, a change in the direction may be caused by a change in the output of DER 308. Of course, the change in direction could also be caused by a switching event (i.e., closing contactor 314 and opening contactor 310). Accordingly, the scheme may continue to utilize qualified tap change events to determine the appropriate voltage regulation mode.

Figure 4A:
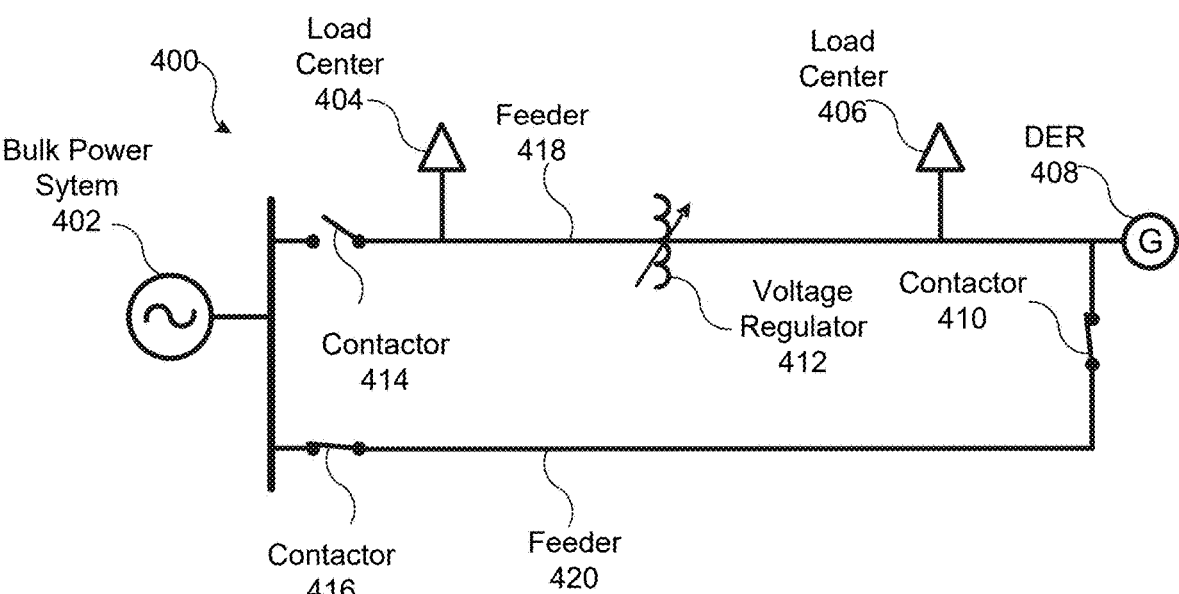
FIG. 4A illustrates a single-line diagram of a portion of an electric power system, including feeders that may be configured in a loop scheme and a single DER consistent with embodiments of the present disclosure.

FIG. 4A illustrates a single-line diagram of a portion of an electric power system 400, including feeders 418 and 420 that may be configured in a loop scheme and a single DER 408 consistent with embodiments of the present disclosure. In the illustrated configuration, DER 408 and bulk power system 402 flow in the same direction (i.e., right to left) from the perspective of voltage regulator 412. As such, in the illustrated configuration, the system should regulate voltage in the reverse operation mode.

Figure 4B:
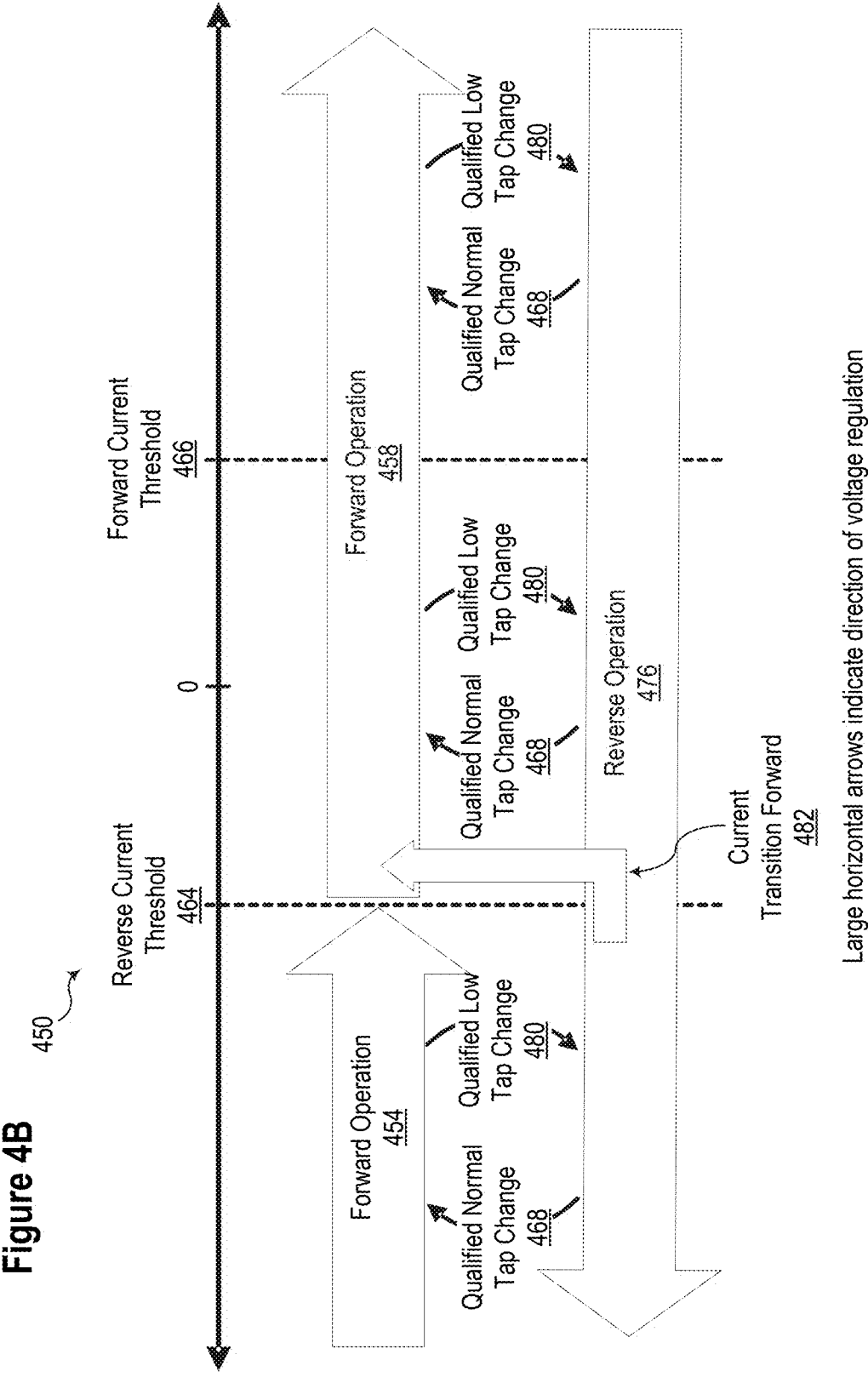
FIG. 4B illustrates a conceptual diagram showing a voltage regulation scheme that may be used in connection with the system illustrated in FIG. 4A and consistent with embodiments of the present disclosure.

FIG. 4B illustrates a conceptual diagram 450 showing a voltage regulation scheme that may be used in connection with system 400, illustrated in FIG. 4A, and consistent with embodiments of the present disclosure. The scheme illustrated in FIG. 4B may enable faster transitions between a reverse operation mode 476 and a forward operation mode 458, as shown by arrow 482. Once a reverse current threshold 464 is no longer exceeded, some embodiments consistent with the present disclosure may immediately transition to the forward operation mode 458, as shown by arrow 482. In other words, unlike the scheme illustrated in FIG. 2B, the scheme illustrated in FIG. 4B may make the transition without waiting for a qualified number of tap changes. Further, in contrast to FIG. 3B, the illustrated embodiment may implement a user setting causing a transition to forward operation mode 458 once the reverse current threshold 464 is no longer exceeded but before the forward current threshold 466 is exceeded.

Once the transition indicated by arrow 482 is complete, a system may continue to verify that the system is operating in the correct mode by evaluating the current flow and source stiffness based on tap changes. As such, even if the rapid transition was made in error, following a threshold number of qualified tap changes, the system may transition to reverse operation mode 476.

A transition from the forward operation mode to the reverse operation mode cannot always be assumed to be the result of a switching event. For example, if contactor 414 is closed, contactor 410 is open, and voltage regulator 412 is regulating in the forward direction (i.e., left to right), a change in the power-flow direction may be caused by a change in the output of DER 408. Of course, the change in direction could also be caused by a switching event. Accordingly, the scheme may continue to utilize qualified tap change events to determine the appropriate voltage regulation mode.

Figure 5A:
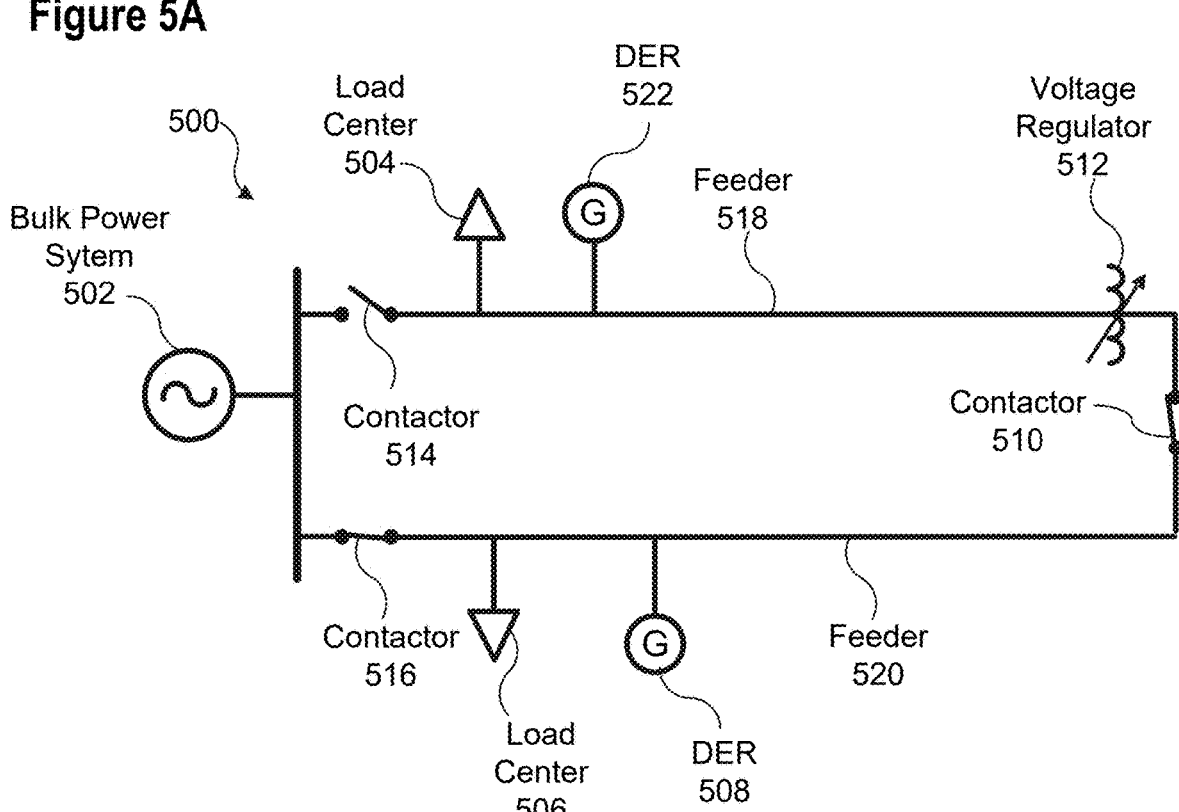
FIG. 5A illustrates a single-line diagram of a portion of an electric power system, including feeders that may be configured in a loop scheme and two DERs consistent with embodiments of the present disclosure.

FIG. 5A illustrates a single-line diagram of a portion of an electric power system 500, including feeders 518 and 520 that may be configured in a loop scheme, two DERs 508 and 522 consistent with embodiments of the present disclosure. In this scenario, voltage regulator 512 is near contactor 510. When contactor 510 is open, very little current flows through voltage regulator 412. If the power flow direction changes, it will most likely be caused by a switching event, resulting in a substantial amount of power flow. As such, the default direction of regulation should be based on the direction of power flow. When the currents are low, it is normally because contactor 510 is open, but voltage regulator 512 may still regulate voltage for the small numbers of loads that are still between voltage regulator 512 and contactor 510. DERs 508 and 522 complicates the analysis because a power flow direction change may be caused by a change in the output of DER 508 or DER 522 rather than a switching event.

Figure 5B:
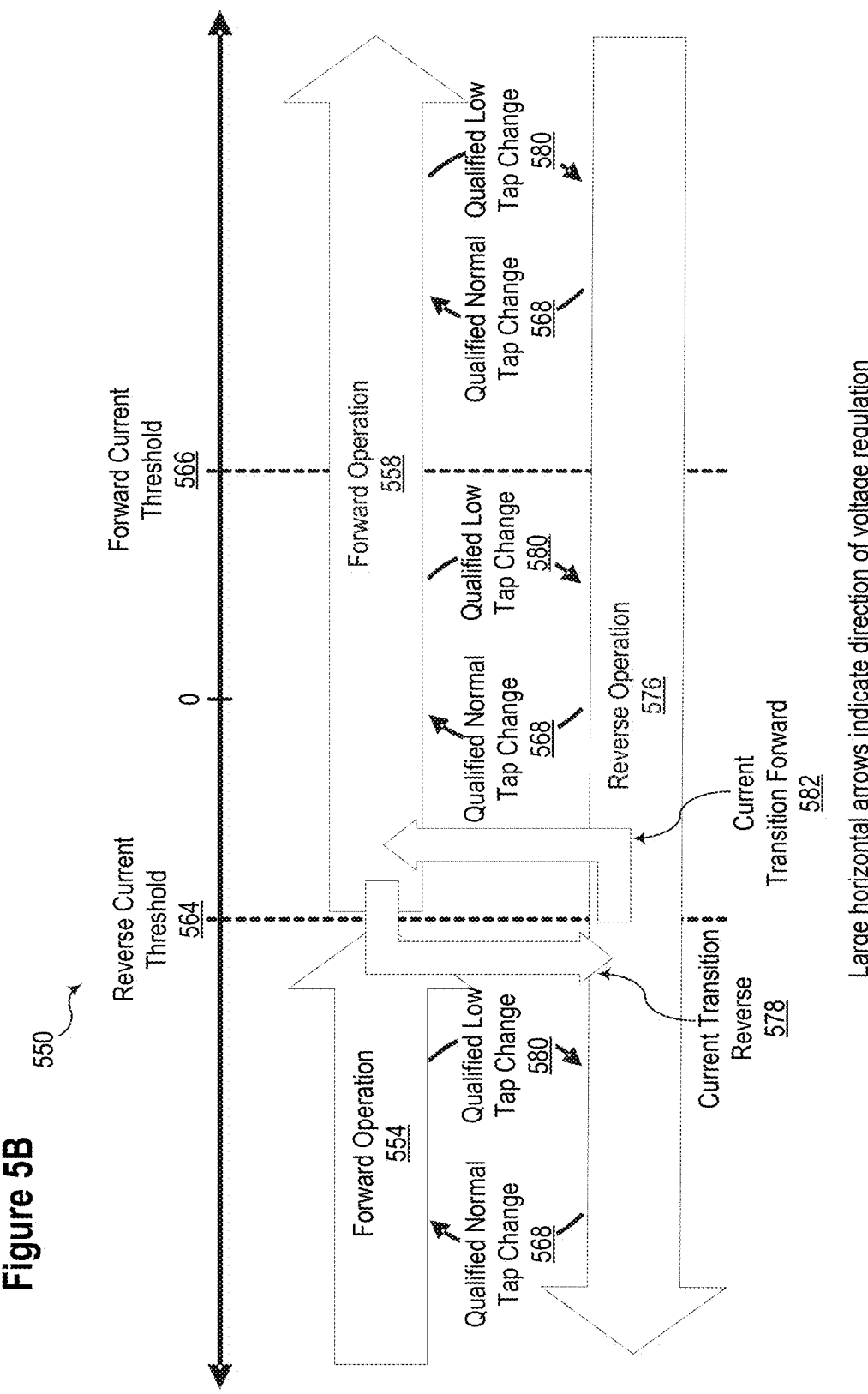
FIG. 5B illustrates a conceptual diagram showing a voltage regulation scheme that may be used in connection with the system illustrated in FIG. 5A and consistent with embodiments of the present disclosure.

FIG. 5B illustrates a conceptual diagram 550 showing a voltage regulation scheme that may be used in connection with system 500, illustrated in FIG. 5A, and consistent with embodiments of the present disclosure. A system implementing the scheme illustrated in FIG. 5B may rapidly transition from forward operation mode 558 to reverse operation mode 576 based on the reverse current threshold 564, as shown by arrow 578. The system may also rapidly transition from reverse operation mode 576 to forward operation mode 558 based on the reverse current threshold of 564, as shown by arrow 582. As in other embodiments, a system may transition between the modes of operation based on a threshold number of qualified normal tap changes 568 and a threshold number of qualified low tap changes 580.

Figure 6:
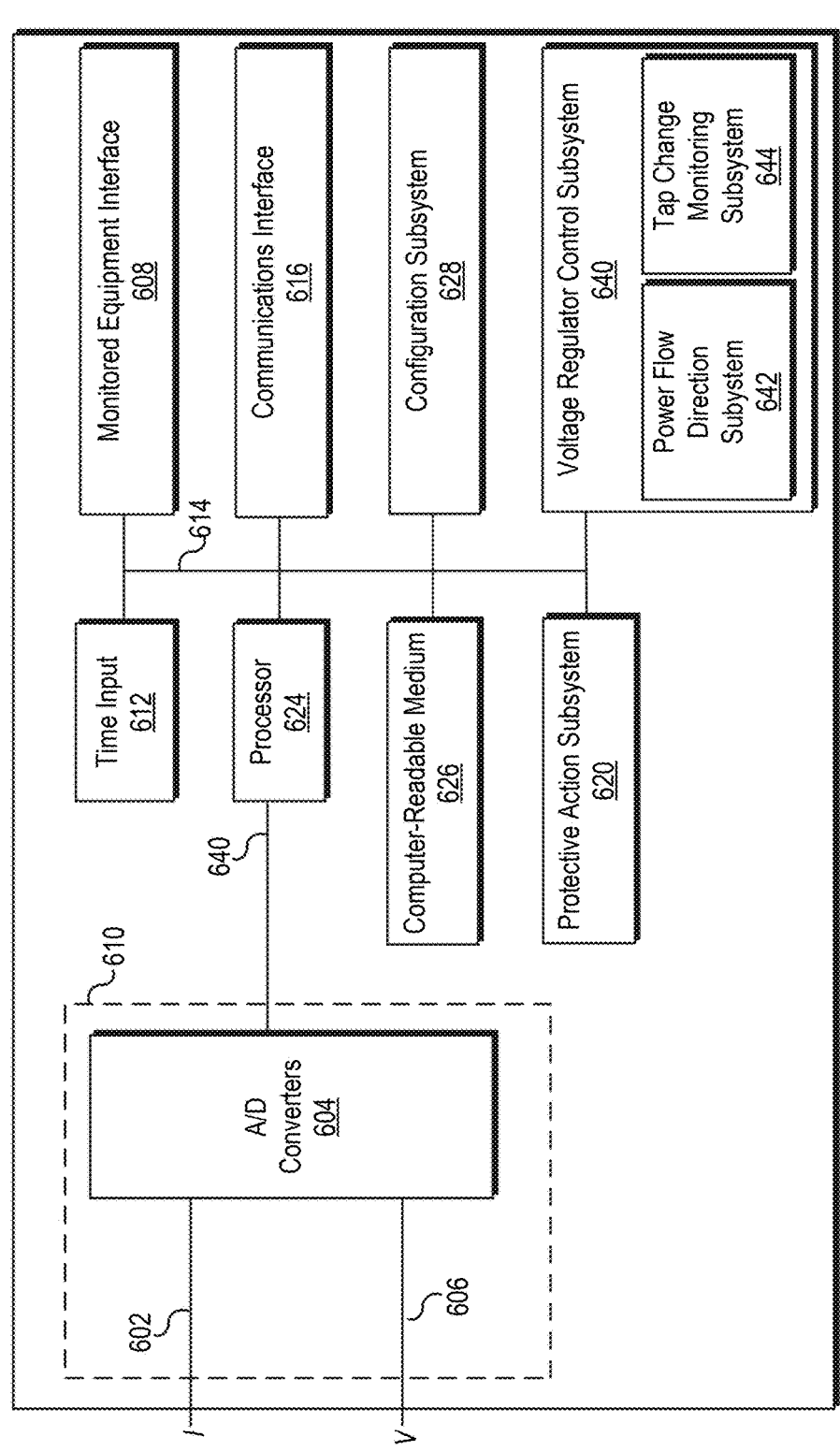
FIG. 6 illustrates a simplified block diagram of a system configured to monitor and control a voltage regulator consistent with embodiments of the present disclosure.

FIG. 6 illustrates a simplified block diagram of a system 600 configured to monitor and control a voltage regulator consistent with embodiments of the present disclosure. System 600 may be implemented using hardware, software, firmware, and/or any combination thereof. In some embodiments, system 600 may be embodied as an IED, a protective relay, or other type of device. Certain components or functions described herein may be associated with other devices or performed by other devices. The specifically illustrated configuration merely represents one embodiment consistent with the present disclosure. In some embodiments, system 600 may be incorporated into a voltage regulator, while in other embodiments, system 600 may be embodied as a separate device in communication with the voltage regulator.

System 600 includes a communications interface 616 to communicate with relays, IEDs, and/or other devices. In certain embodiments, the communications interface 616 may facilitate direct communication or communicate with systems over a communications network (not shown). System 600 may further include a time input 612, which may be used to receive a time signal (e.g., a common time reference), allowing system 600 to apply a time stamp to acquired samples. In certain embodiments, a common time reference may be received via communications interface 616, and accordingly, a separate time input may not be required for time-stamping and/or synchronization operations. One such embodiment may employ the IEEE 1588 protocol.

A monitored equipment interface 608 may receive status information from and issue control instructions or protective actions to monitored equipment (e.g., a voltage transformer). Control instructions may include tap changes and the direction of regulation, among other things.

Processor 624 processes communications received via communications interface 616, time input 612, and/or monitored equipment interface 608. Processor 624 may operate using any number of processing rates and architectures. Processor 624 may perform various algorithms and calculations described herein. Processor 624 may be embodied as a general-purpose integrated circuit, an application-specific integrated circuit, a field-programmable gate array, and/or any other suitable programmable logic device. A data bus 614 may provide a connection between various components of system 600. A configuration subsystem 628 may allow an operator to configure various aspects of system 600, including criteria related to thresholds or parameters described above.

Instructions to be executed by processor 624 may be stored in computer-readable medium 626. Computer-readable medium 626 may comprise random access memory (RAM) and non-transitory memory. Computer-readable medium 626 may be the repository of software modules configured to implement the functionality described herein.

System 600 may include a sensor component 610. In the illustrated embodiment, sensor component 610 may receive current measurements 602 and/or voltage measurements 606. The sensor component 610 may comprise A/D converters 604 that sample and/or digitize filtered waveforms to form corresponding digitized current and voltage signals. Current measurements 602 and/or voltage measurements 606 may include separate signals from each phase of a three-phase electric power system. A/D converters 604 may be connected to processor 624 through data bus 640, through which digitized representations of current and voltage signals may be transmitted. Sensor component 610 may monitor the direction of power flow, and the direction of power flow may be used, along with the result of tap changes, to determine a direction of voltage regulation.

A voltage regulator control subsystem 630 may be configured to monitor and control a voltage regulator in an electric power system. Among other things, voltage regulator control subsystem 630 may monitor the direction of power flow using a power flow direction subsystem 632 and the impact of tap changes implemented by the voltage regulator using a tap change monitoring subsystem 644. Power flow direction subsystem 632 may utilize current measurements from A/D converters 604 in some embodiments. Similarly, tap change monitoring subsystem 644 may utilize voltage measurements from A/D converters 604. In other embodiments, voltage and current measurements may be received from other equipment using communications interface 616 and/or monitored equipment interface 608.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A system configured to control a voltage regulator in an electric power system, the system comprising:
    a communication interface configured to communicate with the voltage regulator;
    a power flow direction subsystem to determine a direction of a current flow in a portion of the electric power system;
    a tap change monitoring subsystem to:
        monitor a plurality of tap changes implemented by the voltage regulator;
        evaluate a voltage change resulting from each of the plurality of tap changes implemented by the voltage regulator; and
        determine a source stiffness value for a first source and a second source; and
    a voltage regulator control subsystem configured to:
        determine a regulation direction based on the direction of current flow determined by the power flow direction subsystem and based on the source stiffness value for the first source and the second source, and
        communicate the regulation direction to the voltage regulator through the communication interface.

2. The system of claim 1, wherein the system is configured to monitor a portion of the electric power system configurable in a loop based on a state of a plurality of contactors.

3. The system of claim 1, wherein the system is configured to determine the regulation direction without information regarding a state of a plurality of contactors in the electric power system.

4. The system of claim 1, wherein the first source comprises a bulk power system comprising a plurality of power sources, and the second source comprises at least one distributed energy resource.

5. The system of claim 1, wherein the voltage regulator control subsystem is further configured to initialize in a forward operation mode in which the regulation direction is established.

6. The system of claim 5, wherein the system is configured to transition from the forward operation mode to a reverse operation mode based on a first threshold number of qualified low tap changes identified by the tap change monitoring subsystem.

7. The system of claim 6, wherein the system is configured to transition from the reverse operation mode to the forward operation mode based on a second threshold number of qualified normal tap changes identified by the tap change monitoring subsystem.

8. The system of claim 1, wherein the power flow direction subsystem is configured to determine a forward power condition based on the current flow exceeding a forward current threshold.

9. The system of claim 8, wherein the power flow direction subsystem is configured to determine a reverse power condition based on the current flow exceeding a reverse current threshold.

10. The system of claim 9, wherein the system is further configured to transition to an inhibit operating mode in which voltage regulation is suspended and based on the current flow being between the reverse current threshold and the forward current threshold.

11. A method of controlling a voltage regulator in an electric power system, the method comprising:
    determining, using a power flow direction subsystem, a direction of a current flow in a portion of the electric power system;
    monitoring, using a tap change monitoring subsystem, a plurality of tap changes implemented by the voltage regulator;
    monitoring, using the tap change monitoring subsystem, a voltage change resulting from each of the plurality of tap changes implemented by the voltage regulator;
    evaluating, using the tap change monitoring subsystem, a source stiffness value for a first source and a second source;
    determining, using a voltage regulator control subsystem, a regulation direction based on the direction of current flow determined by the power flow direction subsystem and based on the source stiffness value for the first source and the second source; and
    communicating, using a communication interface, the regulation direction to the voltage regulator.

12. The method of claim 11, wherein the electric power system is configured to determine the regulation direction without information regarding a state of a plurality of contactors in the electric power system.

13. The method of claim 11, wherein the first source comprises a bulk power system comprising a plurality of power sources, and the second source comprises at least one distributed energy resource.

14. The method of claim 11, further comprising initializing the voltage regulator control subsystem in a forward operation mode in which the regulation direction is established.

15. The method of claim 14, further comprising:
    identifying, using the tap change monitoring subsystem, a first threshold number of qualified low tap changes; and
    transitioning from the forward operation mode to a reverse operation mode.

16. The method of claim 15, further comprising:
    identifying, using the tap change monitoring subsystem, a second threshold number of qualified normal tap changes; and
    transitioning from the reverse operation mode to the forward operation mode.

17. The method of claim 11, further comprising determining, using the power flow direction subsystem, a forward power condition based on the current flow exceeding a forward current threshold.

18. The method of claim 17, further comprising determining, using the power flow direction subsystem, a reverse power condition based on the current flow exceeding a reverse current threshold.

19. The method of claim 18, further comprising transitioning to an inhibit operating mode in which voltage regulation is suspended and based on the current flow being between the reverse current threshold and the forward current threshold.

20. A voltage regulator configured for use in an electric power system, the voltage regulator comprising:

a power flow direction subsystem to determine a direction of a current flow in a portion of the electric power system;

a tap change monitoring subsystem to:

monitor a plurality of tap changes implemented by the voltage regulator;

evaluate a voltage change resulting from each of the plurality of tap changes implemented by the voltage regulator; and determine a source stiffness value for a first source and a second source; and a voltage regulator control subsystem configured to:

determine a regulation direction based on the direction of current flow determined by the power flow direction subsystem and based on the source stiffness value for the first source and the second source.

\*    \*    \*    \*    \*